US 12,500,502 B2

(12) United States Patent
Wisskirchen et al.

(10) Patent No.: US 12,500,502 B2
(45) Date of Patent: Dec. 16, 2025

(54) DRIVE COIL DEVICE

(71) Applicant: Sysko AG Systeme & Komponenten, Jona (CH)

(72) Inventors: Florian Wisskirchen, Weingarten (DE); Norbert Helbling, Jona (CH); Fred Partzsch, Neukirch (DE); Michael Wisskirchen, Bad Wurzach (DE)

(73) Assignee: Sysko AG Systeme & Komponenten, Jona (CH)

( * ) Notice: Subject to any disclaimer, the term of this patent is extended or adjusted under 35 U.S.C. 154(b) by 0 days.

(21) Appl. No.: 18/878,220

(22) PCT Filed: Jun. 28, 2023

(86) PCT No.: PCT/EP2023/067697
§ 371 (c)(1),
(2) Date: Dec. 23, 2024

(87) PCT Pub. No.: WO2024/003164
PCT Pub. Date: Jan. 4, 2024

(65) Prior Publication Data
US 2025/0317042 A1      Oct. 9, 2025

(30) Foreign Application Priority Data

Jun. 28, 2022   (DE) ............... 10 2022 116 095.5

(51) Int. Cl.
*H02K 11/25*       (2016.01)
*A47J 31/36*       (2006.01)
(Continued)

(52) U.S. Cl.
CPC .............. *H02K 44/06* (2013.01); *A47J 31/36* (2013.01); *A47J 31/468* (2018.08); *H02K 11/25* (2016.01); *H02K 2213/06* (2013.01)

(58) Field of Classification Search
CPC .... H02K 11/25; H02K 2213/06; H02K 44/06; A47J 31/468; A47J 31/36; H01F 2007/062; H01F 7/16; H01F 5/04
See application file for complete search history.

(56) References Cited

U.S. PATENT DOCUMENTS 3,479,563 A * 11/1969 Roy ..................... H01F 27/402
                                              361/104
3,585,450 A *  6/1971 Lane ..................... H01F 41/10
                                              310/194
(Continued)

FOREIGN PATENT DOCUMENTS

CN       111853246 A     10/2020
CN       111022741 B      2/2022
(Continued)

OTHER PUBLICATIONS

English translation of International Search Report of the International Searching Authority mailed Oct. 6, 2023 for the corresponding International Application No. PCT/EP2023/067697.
(Continued)

*Primary Examiner* — Burton S Mullins
(74) *Attorney, Agent, or Firm* — Posz Law Group, PLC (57) ABSTRACT

A drive coil device, in particular for an oscillating armature pump, includes at least one coil carrier, further includes at least one coil wire that is wound onto the coil carrier to form a coil, and at least one coil enclosure configured to at least partly enclose the coil, wherein the coil enclosure comprises at least one contact interface which is configured to receive at least an end of the coil wire.

9 Claims, 5 Drawing Sheets

(51) Int. Cl.
*A47J 31/46* (2006.01)
*H01F 5/04* (2006.01)
*H01F 7/16* (2006.01)
*H02K 44/06* (2006.01)

(56) References Cited

U.S. PATENT DOCUMENTS

| | | | | |
|---|---|---|---|---|
| 3,959,675 | A * | 5/1976 | Lautner | H02K 11/25 |
| | | | | 310/194 |
| 4,112,405 | A * | 9/1978 | Joseph | H01F 27/402 |
| | | | | 335/142 |
| 4,132,913 | A * | 1/1979 | Lautner | H02K 11/25 |
| | | | | 310/43 |
| 4,410,924 | A * | 10/1983 | Hewitt | H02H 7/08 |
| | | | | 361/25 |
| 6,326,879 | B1 * | 12/2001 | Hangmann | H01H 37/043 |
| | | | | 337/380 |
| 6,744,160 | B2 * | 6/2004 | Piovesan | H02K 11/25 |
| | | | | 310/71 |
| 7,046,495 | B2 * | 5/2006 | Boischio | H02K 11/25 |
| | | | | 361/23 |
| 10,186,928 | B2 * | 1/2019 | Firat | H02K 11/25 |
| 10,366,852 | B2 * | 7/2019 | Birner | H01H 50/36 |
| 10,431,971 | B2 * | 10/2019 | Randolph | H01F 27/402 |
| 10,468,940 | B2 * | 11/2019 | Li | H02K 11/215 |
| 2003/0151481 | A1 | 8/2003 | Kolarsky | |
| 2010/0259348 | A1 | 10/2010 | Bamber et al. | |
| 2012/0097043 | A1 * | 4/2012 | Moser | A47J 31/468 |
| | | | | 219/494 |
| 2018/0323692 | A1 | 11/2018 | Helbling et al. | |
| 2022/0252175 | A1 | 8/2022 | Koch et al. | |

FOREIGN PATENT DOCUMENTS

| | | |
|---|---|---|
| DE | 723525 C | 8/1942 |
| DE | 102019004597 A1 | 1/2021 |
| EP | 0848180 A1 | 6/1998 |
| EP | 2711548 A2 | 3/2014 |
| EP | 3584810 A1 | 12/2019 |
| EP | 4033132 A1 | 7/2022 |
| WO | 2013/004620 A1 | 1/2013 |

OTHER PUBLICATIONS

International Preliminary Report on Patentability of the International Preliminary Examining Authority mailed Sep. 24, 2024 for the corresponding International Application No. PCT/EP2023/067697.

German Search Report mailed Feb. 3, 2023 for the corresponding German Application No. 10 2022 116 095.5 (and English translation).

* cited by examiner

DRIVE COIL DEVICE

CROSS-REFERENCE TO RELATED APPLICATIONS

This application is a U.S. national stage application of international patent application PCT/EP2023/067697 filed on Jun. 28, 2023, which is based on and claims priority to German patent application DE 10 2022 116 095.5, filed on Jun. 28, 2022, the contents of which are incorporated herein by reference.

PRIOR ART

The invention concerns a drive coil device, an oscillating armature pump and a beverage machine.

Drive coil devices are known which comprise a coil made of copper wire. This coil is usually provided with an overmolding that is configured to protect the coil against displacement of the coil wires or other types of damage.

The objective of the invention is in particular to provide a generic device with improved properties with regard to simple manufacture and/or improved cooling. The objective is achieved according to the invention.

ADVANTAGES OF THE INVENTION

The invention is based on a drive coil device, in particular for an oscillating armature pump, with at least one coil carrier, with at least one coil wire that is wound onto the coil carrier to form a coil, and with at least one coil enclosure configured to at least partly enclose the coil.

It is proposed that the coil enclosure has at least one contact interface which is configured to receive, in particular to contact, at least an end of the coil wire. Providing a contact interface in particular allows achieving simple installation of a device comprising the drive coil device, in particular of the oscillating armature pump.

In particular, the coil carrier is realized in a cylinder shape, in particular a hollow-cylinder shape. In particular, the coil carrier encompasses at least a hollow space that is configured to receive a magnet body, in particular the armature of an oscillating armature pump. In particular, the coil is configured to generate, at least in a current-operated state, a magnetic field which is configured to move the magnet body out of its rest position. In particular, the coil is realized in the shape of a hollow cylinder. In particular, the coil is realized as a long coil, which means that the coil in particular has a length that is greater than an inner diameter of the coil. For example, the coil comprises at least 200 turns, in particular at least 500 turns.

A "coil enclosure" is in particular to mean a mechanical enclosure, in particular a housing. In particular, the coil enclosure is formed at least partly, for example by at least 50%, advantageously by at least 90%, from at least one plastic. The coil enclosure may be configured to cover at least 30%, in particular at least 50%, advantageously at least 60%, of the solid angle around a geometric center point of the coil. In particular, the coil enclosure is configured to cover at least 30%, in particular at least 50%, advantageously at least 60%, of the possible directions and/or angles around a middle axis of the coil. Advantageously the coil enclosure comprises holes and/or gaps. Preferably the holes and/or gaps each have a size that amounts to at most 0.2 sr, advantageously at most 0.1 sr, preferably at most 0.05 sr, with respect to the geometric center point of the coil. In particular, these holes and/or gaps serve for a ventilation and/or cooling of the coil. In particular, these holes and/or gaps, in particular with regard to the determination of a solid angle coverage or angle coverage of the coil by the coil enclosure, shall be considered as belonging to the coil enclosure. In particular, a percentage of the holes amounts to at most 90%, for example at most 50%, in particular at most 30%, of a solid angle covered by the coil enclosure. In particular, the holes and/or the gaps each have a size of at most 2 $cm^2$, for example at most 1 $cm^2$, in particular at most 0.5 $cm^2$. For example, a total area of the holes and/or gaps is at most 200%, for example at most 100%, in particular at most 50%, of an outer surface area formed by the coil enclosure. For example, at least 10%, in particular at least 50%, advantageously at least 90%, preferably at least 99%, of the coil enclosure are spaced apart from the coil by at least 0.5 mm, in particular at least 1 mm.

The coil wire preferably comprises a single metal wire, which is in particular coated with one or several insulation layers. In particular, the metal wire has a cross-section of at least 0.01 $mm^2$, in particular at least 0.1 $mm^2$, advantageously at least 0.5 $mm^2$. For example, the metal wire has a cross-section of at most 2 $mm^2$, in particular at most 1 $mm^2$, advantageously at most 0.5 $mm^2$.

According to further implementations, the coil wire may be realized as a litz wire, i.e. in particular comprising a twist of several, in particular individually and/or jointly insulated, metal wires.

A "contact interface" is in particular to mean an interface comprising at least two contacts and configured to electrically connect the two contacts to one another. In particular, the contact interface is configured to connect two different electrical conductors to each other, which in particular differ with respect to material, line cross-section and/or construction.

"Contacting" is in particular to mean contacting electrically, i.e. for example creating a quasi-resistance-free galvanic connection.

"Configured" is in particular to mean specially programmed, designed and/or equipped. By an object being configured for a specific function is in particular to be understood that the object fulfils and/or performs this specific function in at least one application state and/or operation state.

It is furthermore proposed that the contact interface comprises at least one insulation-displacement connector, which in particular forms an internal contact and is configured to electrically contact the coil wire via an insulation-displacement contact. In particular, simple and reliable contacting is to be achieved. The insulation-displacement connector is in particular configured to cut open an insulation of the coil wire when the coil wire is inserted and in particular to cut into the metal wire, such that bare-metal contacting is obtained.

It is also proposed that the contact interface comprises, in particular on a side opposite the insulation-displacement connector, at least one external contact, in particular in the form of a soldered contact, for attaching an electrical feed line. In particular, the soldered contact includes at least one hole, in particular in a plate-like contact, which is configured to enable a form-fitting connection, to strengthen a soldered connection and/or to partly receive the feed line. In particular, a mechanically and electrically stable connection is achievable.

Alternatively or additionally, the external contact may also include a plug contact, in particular in the form of a plug or a socket, for a contacting with a corresponding plug contact of the feed line. In particular, the external contact may be configured both for a plug connection and for a soldered connection. According to a further implementation, the external contact may also be realized as an insulation-displacement connector.

According to further implementations, it is proposed that the coil wire comprises an aluminum wire and is in particular realized as an insulated aluminum wire. In particular, a cost-effective implementation is achievable. Moreover, a lower weight of the drive coil device is achievable. According to alternative implementations, the coil wire comprises a copper wire or a stainless-steel wire. Beyond this, implementations with a wire based on one or several other electrically conductive material(s) are conceivable.

Preferably, the coil enclosure differs from a sealing overmolding of the coil. A "sealing overmolding" is in particular to mean an overmolding which is, for example, silicone-, epoxy- and/or thermoplastic-based and is configured to protect the coil against mechanical and/or chemical damage. A sealing overmolding may in particular be configured to avoid or prevent a migration of turns of the coil wire, in particular due to changing magnetic loads. In particular, a sealing overmolding directly adjoins the coil and/or the coil wire. For example, a sealing overmolding may cause a displacement of the turns of the coil during the overmolding, which in turn may cause untimely coil failure.

In particular, the coil is free of a sealing overmolding. Moreover, in particular a smaller design and/or a weight saving is achievable. In particular when using aluminum wire as the coil wire, the sealing overmolding may be dispensed with, since aluminum is more rigid than, for example, copper. However, even if copper wire is used, the coil enclosure may ensure protection of the turns of the coil even without a sealing overmolding. Furthermore, due to the naturally occurring passivation which chemically and electrically insulates the aluminum wire, aluminum is less susceptible to environmental influences and more tolerant to possible damaging of an additional insulating layer. In particular, wire ends of the coil are held and fastened exclusively by the coil enclosure.

In further implementations, the coil enclosure may comprise at least one base body. In particular, the base body is realized integrally with the coil carrier. Preferably the coil enclosure comprises at least one wall which is connected to the base body and/or to the coil carrier in a form-fitting and/or force-fitting manner. Preferably the wall is connected to the base body such that it is mountable and/or detachable without a tool. In particular, the wall and the base body are connected to each other by a snap connection. This allows simple assembly. Preferably the wall is realized in a grid-like manner, in particular with holes and/or gaps.

Moreover, it is proposed that the coil enclosure comprises at least one holder for receiving a thermal fuse, which is configured to arrange the thermal fuse in a proximity of the coil, in particular in mechanical contact with the coil. This in particular allows achieving simple installation of the coil device. The coil device preferably comprises the thermal fuse. In particular, the thermal fuse is configured to be connected in series with the coil. In particular, the thermal fuse is configured to, in particular permanently, interrupt or at least inhibit a current flow through the coil if a limit temperature is exceeded. In particular, the thermal fuse comprises a non-linear resistor. In particular, the thermal fuse is realized as a safety fuse. Alternatively, the thermal fuse may comprise a switch element, in particular a semiconductor switch element or a bimetal switch element. In particular, the holder is configured to accommodate the thermal fuse in a form-fitting manner, in particular by means of at least one snap connection.

The coil enclosure may further comprise at least one diode holder for accommodating a power diode, the power diode being in particular configured to be connected in series with the coil. In particular, this allows achieving simple installation of the coil device. Preferably the coil device comprises the power diode. In particular, the power diode is configured to allow a current flow through the coil only in one current direction, in particular in order to avoid a deflection of the armature of the oscillating armature coil in a wrong direction. In particular, the diode holder is configured to accommodate the power diode in a form-fitting manner, in particular by means of at least one snap connection.

It is moreover proposed that the coil enclosure comprises at least one, at least two or at least three further contact interfaces. In particular, a first one of the further contact interfaces is configured to contact a second end of the coil wire, in particular by means of an insulation-displacement connector, and to contact a first connection contact of the power diode or of the thermal switch, in particular by means of an insulation-displacement connector. In particular, a second contact interface of the further contact interfaces is configured to contact a second connection contact of the thermal fuse or of the thermal switch, in particular by means of a further insulation-displacement connector, the further insulation-displacement connector in particular comprising a further soldered contact for attaching a further feed line. In particular, a third contact interface of the further contact interfaces is configured to contact a second connection contact of the power diode and a first connection contact of the thermal fuse. In particular, compact design and/or simple installation or assembly are/is achievable.

Preferably the drive coil device comprises at least one magnetic field bundling unit, in particular also referred to as a coil core or yoke plate, which frames the coil at least with respect to a main plane that intersects with a longitudinal axis of the coil. It is in this way in particular possible to attain compact design and high efficiency. The magnetic field bundling unit in particular comprises at least one magnetic field bundling element, for example at least two magnetic field bundling elements. The magnetic field bundling element is in particular made at least to a large extent of a ferromagnetic material, a ferrite and/or a material that is comparable to ferrite at least with regard to magnetic properties. In particular, the magnetic field bundling unit is configured to guide and/or bind an external magnetic field of the coil.

Preferably the wall covers a side surface of the coil that is free of the magnetic field bundling unit. In particular, a material-saving implementation is achievable, since in particular the magnetic field bundling unit and the coil enclosure together enclose the coil. In particular, the coil enclosure may be configured to completely enclose the coil together with the magnetic field bundling unit. In particular, the wall is arranged at least substantially parallel to the main plane, such that in particular a greatest distance between the wall and the main plane is equivalent to at most 150%, in particular at most 110%, of a smallest distance between the wall and the main plane. Preferably the wall has a distance to the coil, in particular at least to turns of the coil, which is at least 2.5 mm. However, it is also conceivable that the distance between the wall and the coil is partially reduced, in particular in regions in which neither components nor lines are arranged on the wall.

Beyond this, it is proposed that the coil enclosure, in particular the base body, and the magnetic field bundling unit each comprise at least one form-fitting element, said form-fitting elements being jointly configured to connect the coil enclosure to the magnetic field bundling unit in a form-fitting manner. In particular, simple assembly is achievable. In particular, the coil enclosure, in particular at least the base body, is arranged at least partly, in particular by at least 20%, within a frame formed by the magnetic field bundling unit.

According to a further implementation, the invention is based on a drive coil device, in particular for an oscillating armature pump, with at least one coil carrier and with at least one coil wire that is wound onto the coil carrier to form a coil, wherein the coil wire comprises an aluminum wire. It is proposed that the drive coil device comprises a base body having a contact interface which is configured to receive at least an end of the coil wire. In particular, the base body is realized integrally with the coil carrier. Alternatively, the base body and the coil carrier are realized in a multiple-piece implementation with each other. A "contact interface" is in particular to mean an interface comprising at least two contacts and configured to electrically connect the two contacts to each other. In particular, the contact interface is configured to connect two different electrical conductors to each other, which in particular differ with respect to material, line cross-section and/or construction. In particular, advantageous weight saving and material saving are achievable.

It is further proposed that the drive coil device is free of at least one wall. Preferably the base body encloses the coil in at least two extension directions. In particular, advantageous weight saving and material saving are achievable.

Furthermore, an oscillating armature pump comprising at least one afore-described drive coil device and a beverage machine, in particular a coffee machine, with at least one such oscillating armature pump are proposed.

DRAWINGS

Further advantages will become apparent from the following description of the drawings. An exemplary embodiment of the invention is illustrated in the drawings. The drawings, the description and the claims contain a plurality of features in combination. Someone skilled in the art will purposefully also consider the features individually and will find further expedient combinations.

In the drawings.

DESCRIPTION OF THE EXEMPLARY EMBODIMENT

Figure 1:
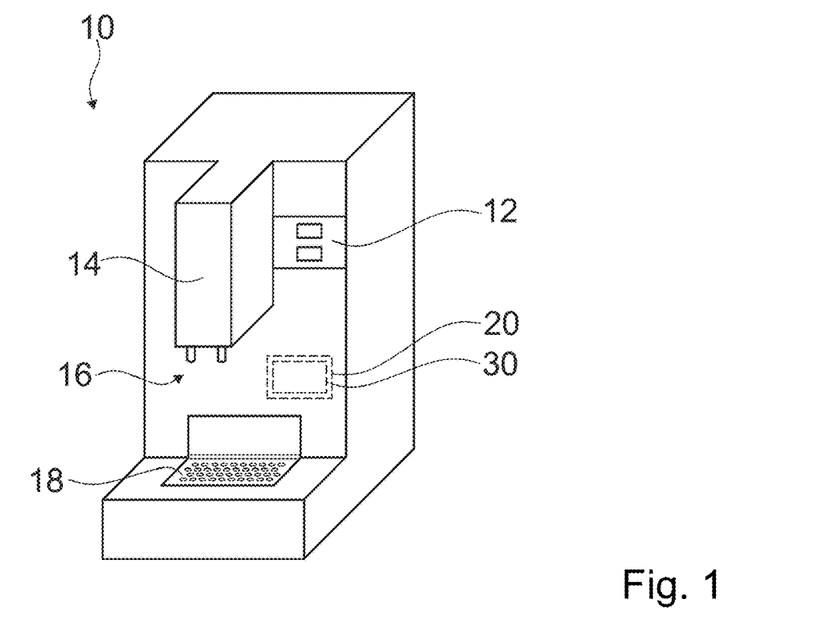
FIG. 1 shows a beverage machine according to the invention in a schematic illustration.

FIG. 1 shows a beverage machine 10. The beverage machine 10 is realized as a coffee machine. The beverage machine 10 is realized as a capsule coffee machine. The beverage machine 10 comprises an operating unit 12. The beverage machine 10 further comprises a dispensing unit 14 by means of which a beverage can be dispensed. The beverage machine 10 comprises a placement surface 18. The placement surface 18 is in particular realized as a sieve in order, for example, to collect overflowing beverage. A placement space 16, for example for a beverage container, in particular a cup or a mug, is arranged between the placement surface 18 and the dispensing unit 14.

The beverage machine 10 further comprises an oscillating armature pump 20. The oscillating armature pump 20 is configured for conveying a liquid. The oscillating armature pump 20 is configured for pressing heated water into a coffee-dosing capsule under pressure.

The oscillating armature pump 20 comprises a drive coil device 30.

Figure 2:
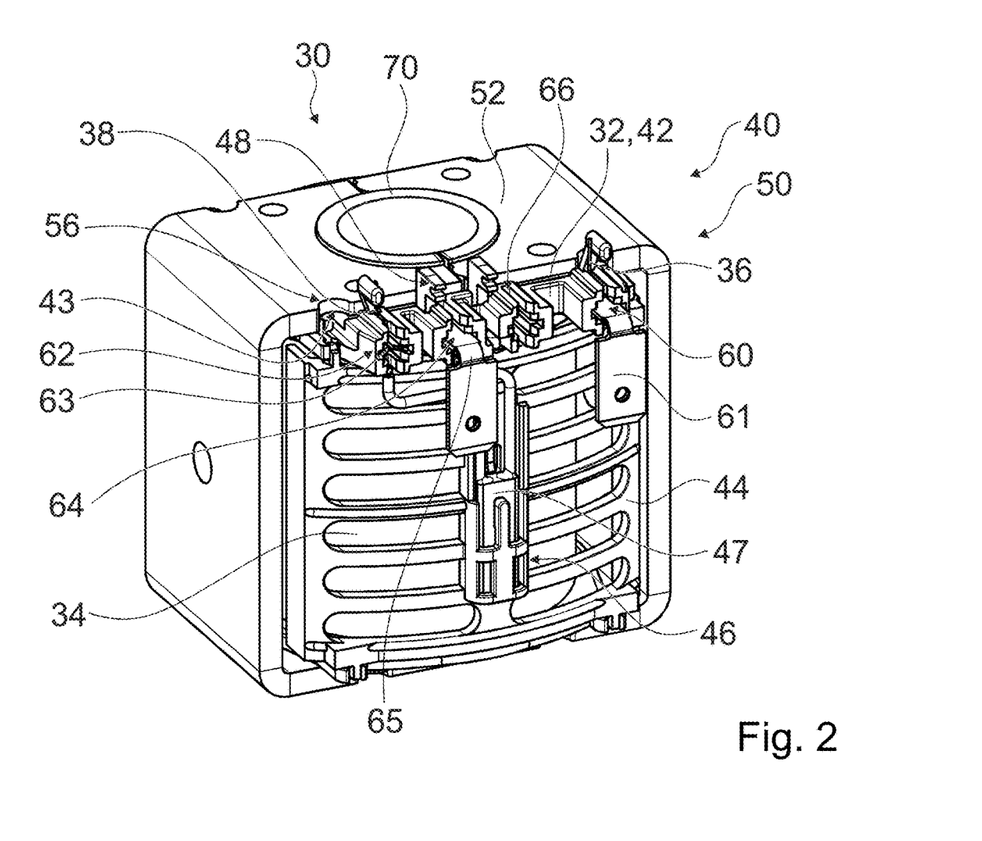
FIG. 2 shows a drive coil device according to the invention in a schematic illustration.

The drive coil device 30 comprises a coil carrier 32 (cf. FIG. 2). The drive coil device 30 further comprises a coil wire, which is wound onto the coil carrier 32 to form a coil 34. The drive coil device 30 comprises a coil enclosure 40, which is configured to partly enclose the coil 34.

The coil enclosure 40 comprises a contact interface 60, which is configured to receive at least an end 36 of the coil wire.

The contact interface 60 comprises an insulation-displacement connector 61, which is configured to electrically contact the end 36 of the coil wire via an insulation-displacement contact.

The insulation-displacement connector 61 comprises a contact point that is realized as a plug contact for attaching an electrical feed line, in particular for a contacting by means of a blade receptacle. Alternatively, the insulation-displacement connector may comprise a soldered contact. According to a further alternative, the contact point for attaching an electrical feed line is realized as a component that is separate from the insulation-displacement connector. According to further implementations, the contact interface may comprise a contact element that is alternative to the insulation-displacement contact, in particular a screw contact or plug contact, for a contacting of the coil wire.

The coil wire comprises an aluminum wire. The coil wire is realized as an insulated aluminum wire.

The coil enclosure 40 differs from a sealing overmolding of the coil 34. The coil 34 is free of a sealing overmolding.

Figure 6:
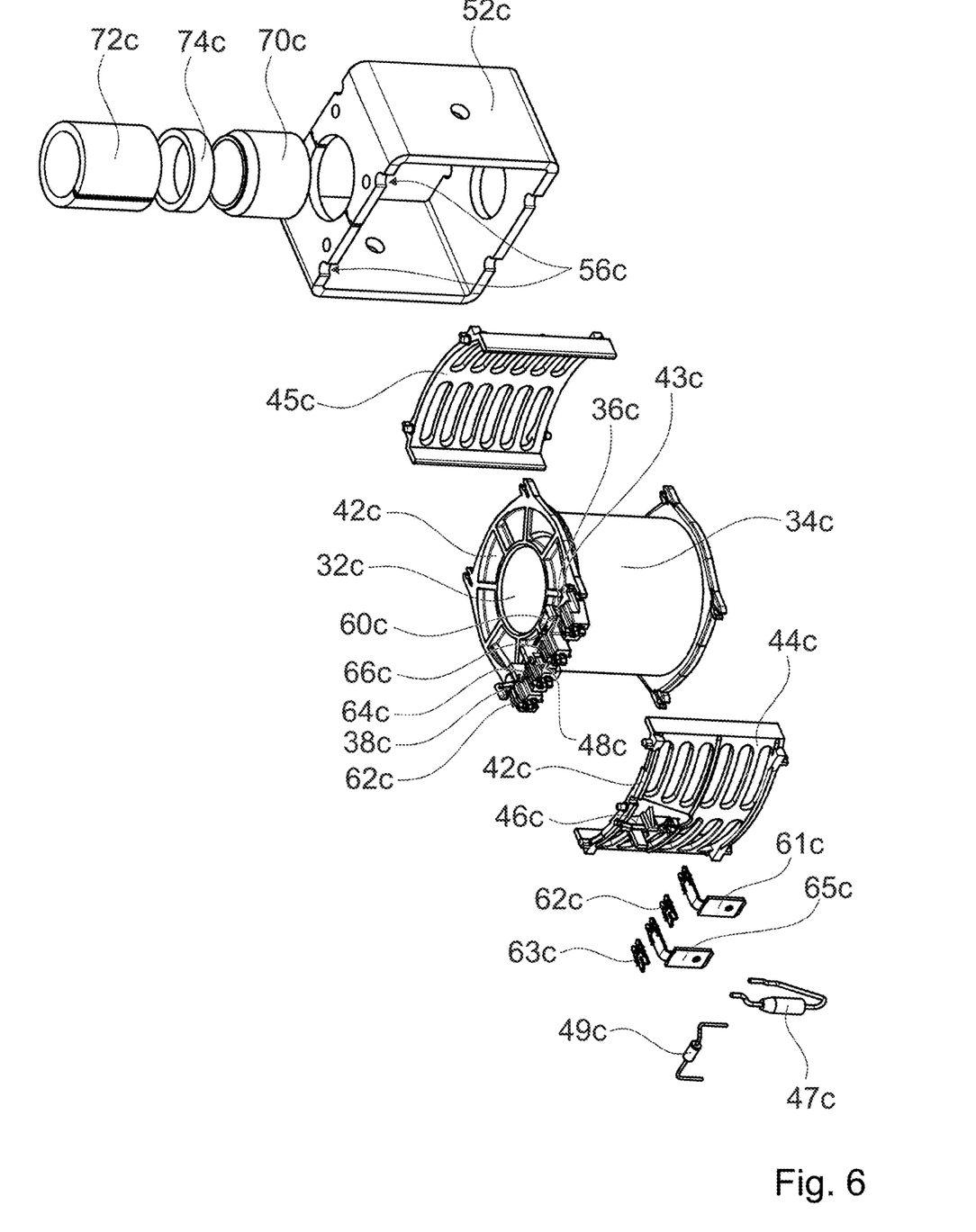
FIG. 6 shows an exploded view of the drive coil device according to FIG. 5.

The coil enclosure 40 comprises a base body 42 and at least one wall 44, in particular two walls 44, 45, alternatively exactly one wall 44 (cf. in particular also FIG. 6).

The contact interface 60 is realized on the base body 42. The base body 42 comprises, for example, two cover plates, which are each arranged at different longitudinal ends of the coil 34. The cover plates are realized integrally with the coil carrier 32. The contact interface 60 is realized on one of the cover plates.

The walls 44, 45 are in each case connected or connectable to the base body 42 in such a way that they are mountable and/or detachable without a tool. For example, the base body 42 comprises latching hollows, which are configured to receive latching pins of the walls 44, 45.

According to a further implementation, it is possible that at least one of the two cover plates, in particular the two cover plates, is/are realized separately from the coil carrier. For example, the two cover plates are realized integrally with one of the walls or are connected thereto rigidly and/or such that they cannot be separated therefrom without a tool. The cover plates may be connected to the coil carrier in a form-fitting and/or force-fitting manner. For example, in such a case only one of the walls is connected or connectable to the base body in such a way that it is mountable and/or detachable without a tool.

The coil enclosure 40 comprises a holder 46 for accommodating a thermal fuse 47. The drive coil device 30 comprises the thermal fuse 47, which is accommodated in the holder 46. The holder 46 is configured to arrange the thermal fuse 47 in a proximity of the coil. The thermal fuse 47 is realized, for example, as a bimetal switch, alternatively for example as a semiconductor switch. The holder 46 is configured to accommodate the thermal fuse 47 per se in an accommodation space, in particular a cage-like accommodation space. The holder 46 further comprises a form-fitting element, in particular a latching lug, which is configured to hold the thermal fuse 47 in the accommodation space. The holder 46 is formed by the coil enclosure 40 itself, in particular the wall 44, and is in particular formed therein. The holder 46 is realized on the wall 44.

The coil enclosure 40 comprises a diode holder 48 for accommodating a power diode. In the assembly shown, the drive coil device 30 does not have a power diode arranged in the diode holder 48. According to a further implementation, the diode holder 48 is dispensed with. The diode holder 48 is formed by the coil enclosure 40 itself, in particular the base body 42, for example by one of the cover plates, and is in particular formed therein.

The coil enclosure 40 comprises three further contact interfaces 62, 64, 66. A first contact interface 62 of the further contact interfaces 62, 64, 66 is configured to electrically contact a second end 38 of the coil wire by means of a double insulation-displacement connector 63.

The double insulation-displacement connector 63 is further configured to electrically contact a first connection contact of the thermal fuse 47.

A second contact interface 64 of the further contact interfaces 62, 64, 66 is configured to contact a second connection contact of the thermal fuse 47 by means of a further insulation-displacement connector 65, the further insulation-displacement connector 65 comprising a further contact point that is realized as a plug contact for attaching a further feed line.

A third contact interface 66 of the further contact interfaces 62, 64, 66 remains unequipped. According to a further implementation, the third further contact interface 66 is dispensed with.

The drive coil device 30 further comprises a magnetic field bundling unit 50, which frames the coil 34 at least with respect to a main plane that intersects with a longitudinal axis of the coil 34. The magnetic field bundling unit 50 comprises a magnetic field bundling element 52. The magnetic field bundling element 52 is made of a ferromagnetic material. The magnetic field bundling element 52 forms a frame around the coil 34. The coil enclosure 40, in particular at least the base body 42 or the cover plates of the base body 42, is/are arranged partly within the frame. The wall 44 covers a side surface of the coil 34 that is free of the magnetic field bundling unit 50. The wall 44 covers an open side of the frame formed by the magnetic field bundling unit. The magnetic field bundling unit 50 further comprises pole sleeves 70, 72, which are arranged in an inner space surrounded by the coil 34 and the coil carrier 32, in particular for the purpose of directing, conveying and/or guiding a magnetic field generated by the coil during operation (cf. in particular FIG. 6). The pole sleeves 70, 72 are separated from one another by a non-magnetic spacer ring 74. The pole sleeves 72, 74 are each realized so as to be slotted. The pole sleeves 70, 72 each have a longitudinal slot. The pole sleeves 70, 72 are formed, for example, from rolled and/or bent sheet metal.

Alternatively, the pole sleeves may also be realized without a longitudinal slot, in particular as a turned piece.

The coil enclosure 40 and the magnetic field bundling unit 50 each comprise form-fitting elements 56, 43, which are jointly configured to connect the coil enclosure 40 to the magnetic field bundling unit 50 in a form-fitting manner or to fix at least one position of the magnetic field bundling unit 50, in particular at least of the magnetic field bundling element 52, relative to the coil enclosure 40. During assembly, following the winding of the coil 34, the magnetic field bundling element 52 is plugged onto the base body 42 of the coil enclosure 40. Then the pole sleeves 70, 72 and the spacer ring 74 are introduced into the coil carrier 32. The pole sleeves 70, 72 protrude somewhat from the coil carrier 32 and are configured to connect the coil carrier 32 and the magnetic field bundling element 52 to each other in a form-fitting manner.

According to alternative implementations, it is conceivable that the magnetic field bundling element, which forms a frame around the coil, is realized in a multi-part implementation.

Three further implementations of the invention are illustrated in FIGS. 3 to 5 and 7. In order to differentiate between the implementations, letters a, b, c or d are respectively added to the reference numerals of the further implementations, wherein identical reference numerals are used for identical or at least functionally related components. The further description is limited substantially to the differences between the implementations, wherein with regard to components, features and functions remaining the same, reference may be made to the description of the exemplary embodiment of FIGS. 1 and 2. With regard to components having the same denomination, in particular with regard to components having the same reference numerals, reference may in principle also be made to the drawings and/or the description of the exemplary embodiment of FIGS. 1 and 2.

Figure 3:
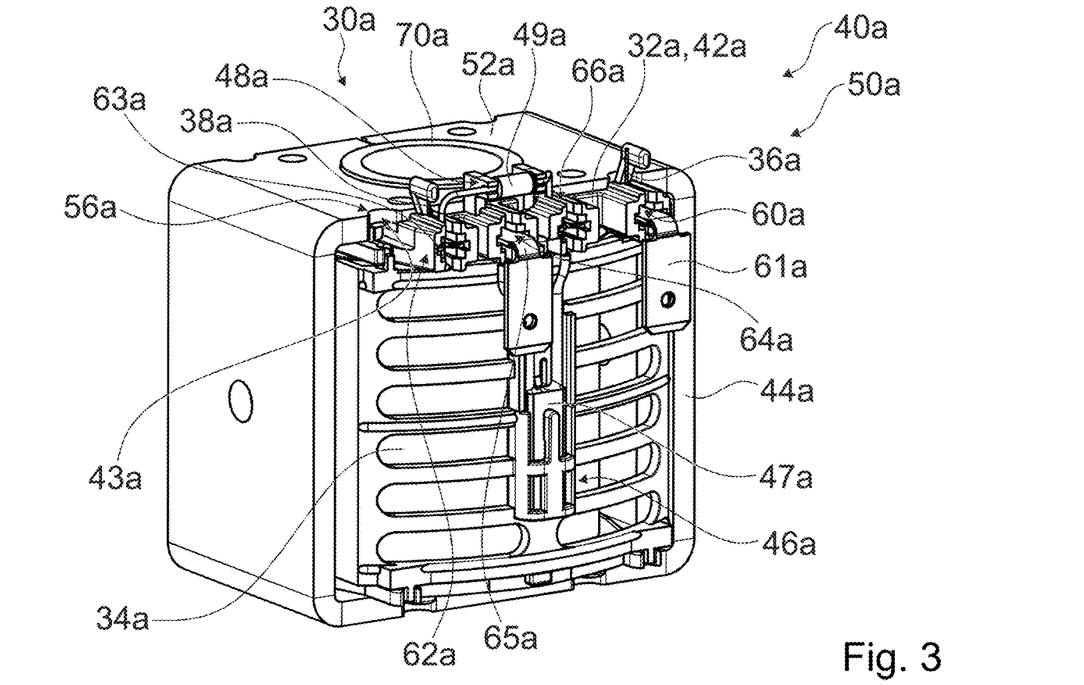
FIG. 3 shows a drive coil device according to the invention in a schematic illustration.

FIG. 3 shows a drive coil device 30a. The drive coil device 30a comprises a power diode 49a. The power diode 49a is connected in series with the coil 34a. The diode holder 48a is configured to accommodate both contact wires of the power diode 49a in a form-fitting manner, in particular in each case in a clamp of the diode holder, the power diode itself being preferably arranged between the clamps.

A first contact interface 62a of the further contact interfaces is configured to contact a second end 38a of the coil wire by means of a double insulation-displacement connector 63a and to contact a first connection contact of the power diode 49a.

A second contact interface 64a of the further contact interfaces is configured to contact a second connection contact of the thermal fuse 47a by means of a further insulation-displacement connector 65a, the further insulation-displacement connector 65a comprising a further soldered contact for attaching a further feed line.

A third contact interface 66a of the further contact interfaces is configured to contact a second connection contact of the power diode 49a and a first connection contact of the thermal fuse 47a.

Figure 4:
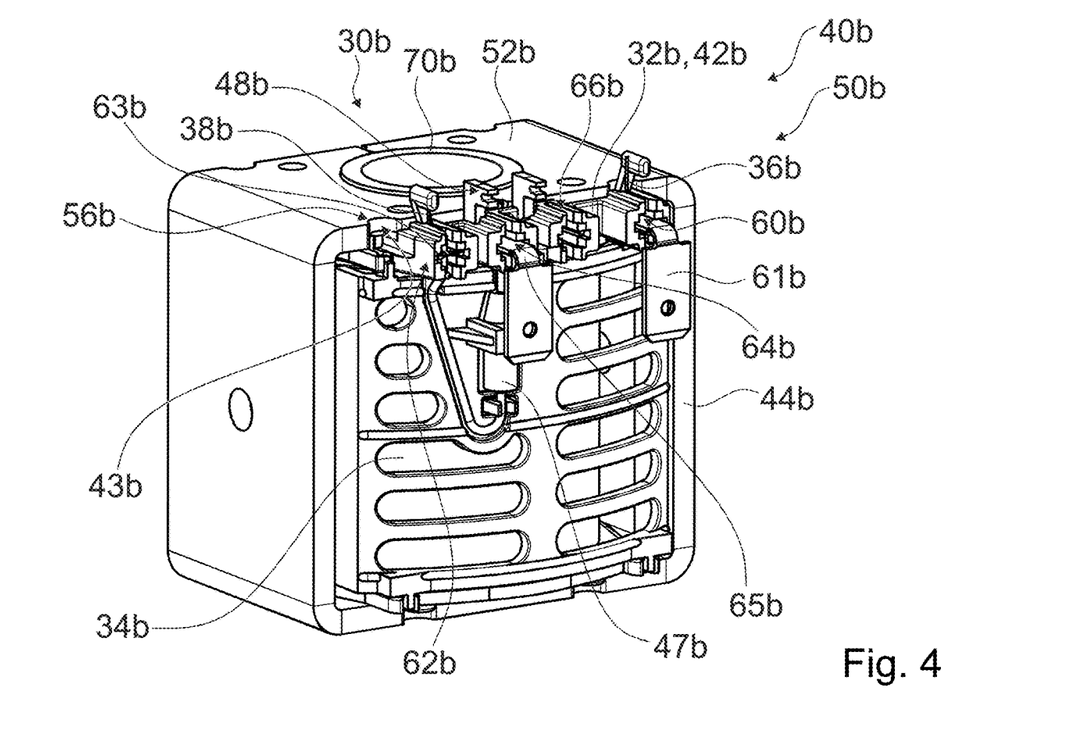
FIG. 4 shows a drive coil device according to the invention in a schematic illustration.

FIG. 4 shows a modification of the implementation according to FIG. 2, wherein the thermal fuse 47b is realized as a safety fuse. The holder 46b is realized as a clamp which is configured to engage around the thermal fuse 47b. The coil enclosure 40b, in particular the wall 44b, comprises guide channels for guiding and holding contact conductors of the thermal fuse 47b to the contact interfaces 64, 66.

Figure 5:
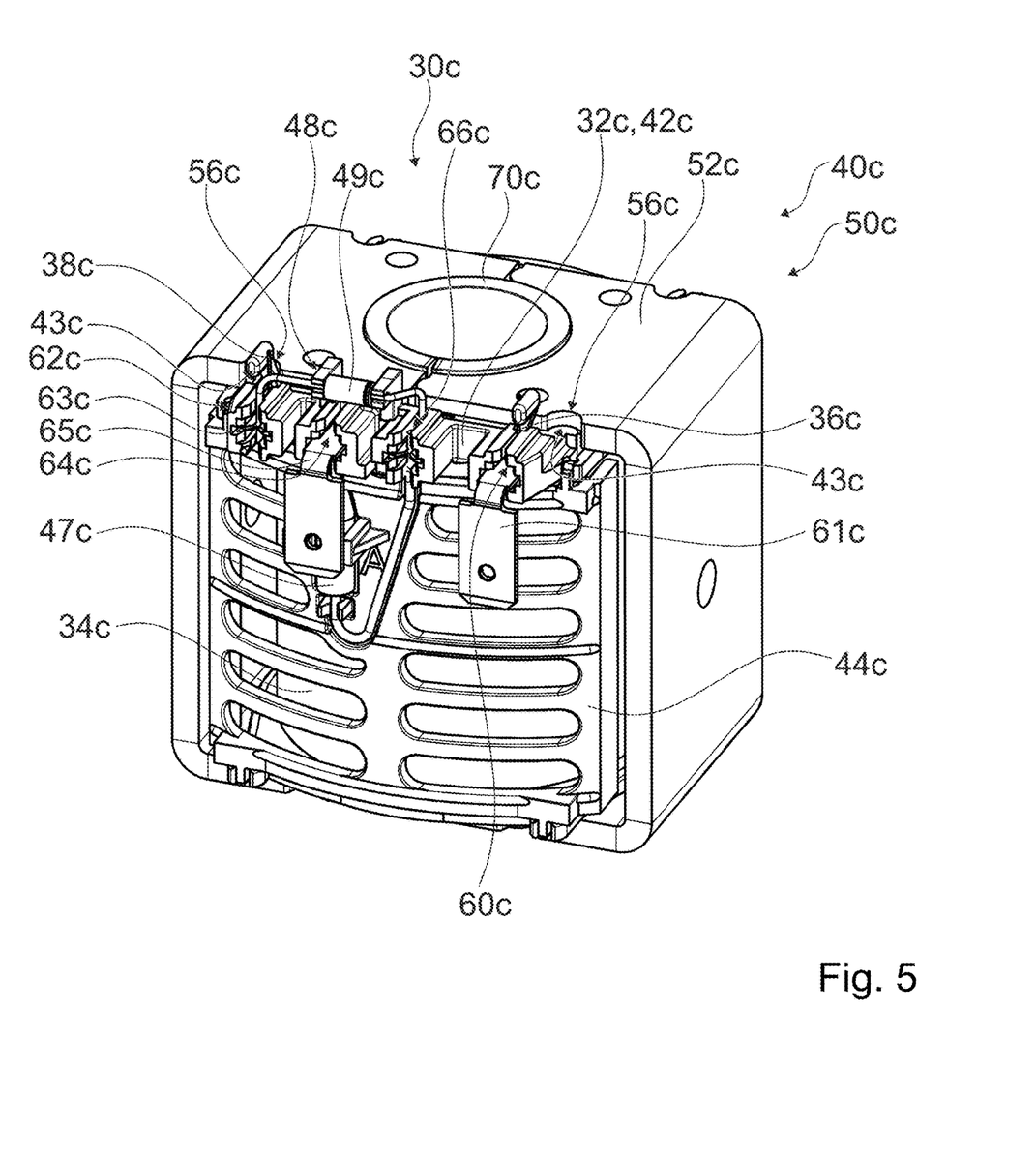
FIG. 5 shows a drive coil device according to the invention in a schematic illustration.

FIG. 5 shows a modification of the implementation according to FIG. 3, wherein the thermal fuse 47c is realized as a safety fuse.

FIG. 6 shows an exploded view of the drive coil device 30c as an example of the implementation according to FIG. 5. Apart from the modifications with regard to the implementation of the wall 44, the thermal fuse 47 and/or the power diode 49, the implementations according to FIGS. 1 to 4 have equivalent exploded views.

Figure 7:
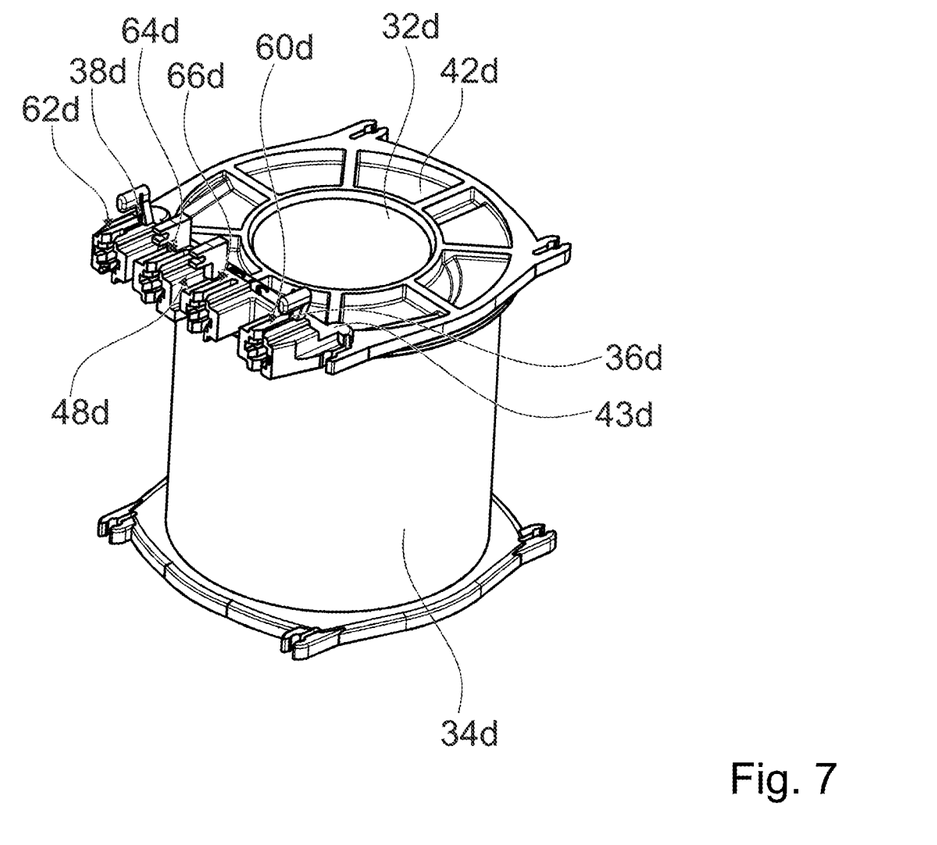
FIG. 7 shows a drive coil device according to the invention in a schematic illustration.

FIG. 7 shows an exemplary embodiment of the drive coil device 30d, with a coil carrier 32d and with a coil wire that is wound onto the coil carrier 32d to form a coil 34d, wherein the coil wire comprises an aluminum wire. The drive coil device 30d comprises a base body 42d having a contact interface 60d, which is configured to receive at least an end 36d of the coil wire. The base body 42d is realized integrally with the coil carrier 32d. Alternatively, the base body 42d and the coil carrier 32d are realized in a multi-part implementation with each other. The drive coil device 30d is free of a wall. The base body 42d encloses the coil 34d in at least two extension directions.

The invention claimed is:

1. A drive coil device, in particular for an oscillating armature pump, with at least one coil carrier, with at least one coil wire that is wound onto the coil carrier to form a coil, and with at least one coil enclosure configured to at least partly enclose the coil,
   wherein the coil enclosure comprises at least one contact interface which is configured to receive at least an end of the coil wire,
   wherein
   the coil enclosure comprises at least one wall which is connected to the coil carrier in at least one of a form-fitting and a force-fitting manner,
   wherein the coil is free of a sealing overmolding,
   wherein the wall is realized in a grid-like manner,
   wherein the contact interface comprises at least one insulation-displacement connector which is configured to electrically contact the coil wire via an insulation-displacement contact,
   wherein the insulation displacement connector comprises at least one contact point, in particular a plug contact, for attaching an electrical feed line,
   wherein the coil enclosure comprises at least one holder for accommodating a thermal fuse, which is configured to arrange the thermal fuse in a proximity of the coil,
   wherein the coil enclosure comprises at least two further contact interfaces, wherein a first contact interface of the further contact interfaces is configured to contact a second end of the coil wire by means of an insulation-displacement connector and to contact a first connection contact of a power diode or of the thermal fuse by means of an insulation displacement connector, and
   a second contact interface of the further contact interfaces is configured to contact a second connection contact of the thermal fuse by means of a further insulation-displacement connector.

2. The drive coil device according to claim 1, wherein the coil wire comprises an aluminum wire.

3. The drive coil device according to claim 1, wherein the coil enclosure differs from a sealing overmolding of the coil.

4. The drive coil device according to claim 1, wherein the coil enclosure comprises at least one diode holder for accommodating a power diode which is configured to be connected in series with the coil.

5. The drive coil device according to claim 1, further comprising at least one magnetic field bundling unit, which frames the coil at least with respect to a main plane that intersects with a longitudinal axis of the coil.

6. The drive coil device according to claim 5, wherein the coil enclosure comprises at least one wall which covers a side surface of the coil that is free of the magnetic field bundling unit.

7. The drive coil device according to claim 5, wherein the coil enclosure and the magnetic field bundling unit each comprise at least one form-fitting element, said form-fitting elements being jointly configured to connect the coil enclosure to the magnetic field bundling unit in a form-fitting manner.

8. An oscillating armature pump comprising at least one drive coil device according to claim 1.

9. A beverage machine, in particular a coffee machine, comprising at least one oscillating armature pump according to claim 8.

* * * * *